United States Patent [19]

Phillips et al.

[11] 4,189,563
[45] Feb. 19, 1980

[54] DRY MANNICH QUATERNARY AMMONIA SALT POLYMERS

[75] Inventors: Kenneth G. Phillips, River Forest; Edward G. Ballweber, Glenwood, both of Ill.

[73] Assignee: Nalco Chemical Company, Oak Brook, Ill.

[21] Appl. No.: 3,069

[22] Filed: Jan. 15, 1979

[51] Int. Cl.$^2$ ................................. C08F 6/22
[52] U.S. Cl. ........................... 528/493; 528/496
[58] Field of Search .......................... 528/493, 496

[56] References Cited

U.S. PATENT DOCUMENTS

| | | | |
|---|---|---|---|
| 3,539,535 | 11/1970 | Wisner | 526/55 |
| 3,790,529 | 2/1974 | Fujimura et al. | 526/55 |
| 3,864,312 | 2/1975 | Suzuki et al. | 260/29.4 UA |
| 3,988,277 | 10/1976 | Witschonke et al. | 260/29.4 UA |
| 4,010,131 | 3/1977 | Phillips et al. | 260/29.4 UA |
| 4,073,763 | 2/1978 | Tai | 260/29.4 UA |
| 4,096,133 | 6/1978 | Zweigle | 526/23 |
| 4,113,685 | 9/1978 | Hubner et al. | 260/29.4 UA |
| 4,120,840 | 10/1978 | Hurlock et al. | 260/29.4 UA |

*Primary Examiner*—Stanford M. Levin
*Attorney, Agent, or Firm*—John G. Premo; Robert A. Miller

[57] ABSTRACT

Quarternary modified water-soluble polymers can be conveniently prepared in solid form by precipitation of the polymer with a water-in-oil emulsion of the polymer utilizing water-soluble organic solvents which are non-solvents for the cationic polymer.

4 Claims, No Drawings

DRY MANNICH QUATERNARY AMMONIA SALT POLYMERS

INTRODUCTION

Quaternary modified water-soluble acrylamide polymers are useful in a variety of applications. Among the uses which have been suggested include the treatment of municipal and industrial wastes, the use of materials of this type as paper additives, emulsion breakers, etc. While polymers of this type have known utility, a serious problem which has plagued their commercial utilization concerns the stability of materials of this type. When made in water-in-oil emulsion form such as described in U.S. Pat. No. 4,010,131 which is hereinafter incorporated by reference, small amounts of unreacted formaldehyde remaining can cause cross-linking of the polymer and lead to its insolubility in water. The insolubility of the polymer renders it useless for most aqueous applications. While various artisans have attempted to solve this problem, see for example U.S. Pat. No. 4,073,763 to Tai where oxygen containing halogen free inorganic acid stabilizers are suggested, none have been successful based on technical and/or product considerations. Also of interest is U.S. Pat. No. 4,120,840 which suggests the use of phosphorus acid. Other patents related to the stabilization of quaternary modified acrylamide polymers by the Mannich reaction include U.S. Pat. Nos. 4,113,685, 4,096,133 and 3,988,277.

While it is known that non-quaternized cationically modified acrylamides can be recovered from water-in-oil emulsions by precipitation, see Wisner U.S. Pat. Nos. 3,539,535, Fujimura, 3,790,529 and Suzuki 3,864,312, which are all hereinafter incorporated by reference, the art has not been able to provide a solid quaternized cationically modified acrylamide polymer which is stable from cross-linking and can be readily dissolved in water.

It is therefore an object of this invention to provide to the art a stable solid water-soluble quaternary modified acrylamide polymer.

THE INVENTION

In accordance with this invention, it is first necessary to prepare the quaternary modified acrylamide polymer. Polymers of this type both in aqueous and in water-in-oil emulsion form are disclosed in U.S. Pat. No. 4,010,131. This patent briefly discusses subjecting polyacrylamide in either solution and/or water-in-oil emulsion form to the Mannich reaction i.e. reacting the water-soluble polymer with formaldehyde and a secondary amine containing 2-8 carbon atoms preferably dimethyl amine in approximate 1:1 molar ratios. The so modified "Manniched" polymer is then subjected to quaternization utilizing an alkyl halide, ethylene oxide or dimethyl sulfate. Preferred alkylating or quaternizing agents are methyl chloride and dimethyl sulfate. The procedure for preparing these polymers is discussed in U.S. Pat. No. 4,010,131 which is herein incorporated by reference, and need not be elaborated on in this document.

Once the aqueous solution of the quaternized polymer or the water-in-oil emulsion of the quaternized polymer is formed, it is then subjected to recovery by precipitation with a water miscible inert hydrocarbon liquid which is non-solvent for the polymer. Examples of suitable materials include acetone, methanol, ethanol, isopropanol and the like. In our studies of the precipitation of materials of this type, we have found it particularly advantageous to employ 1:1 by volume mixtures of methanol and acetone to initially insolubilize the polymer followed by the addition of further quantities of acetone to provide a filterable material. The resultant precipitate can then be filtered and washed with additional quantities of acetone to remove remaining water and unreacted formaldehyde.

Preferably, techniques to accomplish the separation do not utilize temperatures above about 80°C. The volume of solvent utilized should range from at least 1 to approximately 20 times the volume of the initial aqueous solution or water-in-oil emulsion containing the quaternized polyacrylamide. Preferably, approximately 10 times the volume of solvent is utilized per volume of aqueous solution or water-in-oil emulsion containing the polymer. Following this step, an additional quantity of the water miscible organic liquid is utilized to complete precipitation. The quantity of additional material utilized can range from 1 to 40 times the original volume of aqueous solution or water-in-oil emulsion containing the polymer utilized. Preferably, a quantity of about 15 times the volume of the original solution or emulsion is utilized. The resultant material can then be filtered and if desired, washed with additional solvent and then air dried.

As an example, a water-in-oil emulsion of quaternized polyacrylamide was prepared similar to that of example 5 of U.S. Pat. No. 4,120,840 which is hereinafter incorporated by reference. Part of this material was left unstabilized (compound A); part was stabilized according to the procedure of example 6 contained in that patent (compound B); and, a small sample of the material was precipated according to the instant invention by the following procedure:

50 ml of the water-in-oil emulsion was placed in a container. To this container was slowly added 1000 ml of a 50/50 (volume) mixture of acetone and methanol. With moderate stirring, the mixture became milky in color but the polymer particles did not precipitate. Following this step, 750 ml of acetone was added to the mixture with stirring. After the addition was complete, the resultant precipitated particles contained in the container were allowed to settle and were then filtered off. This material was then washed 3 times with 200 ml quantities of acetone. This material after air drying was labeled compound C.

Colloid titrations were then run on these materials after they had aged designated amounts of time. All 3 materials exhibited 100% of the theoretical cationic charge after both 0 and 24 hours. After 48 hours, a compound A exhibited only a 64% theoretical charge while compounds B and C each exhibited 100% theoretical charge.

From the above results, it is believed that the precipitation step of this invention produces a material which is at least as active as expensive stabilization techniques taught by the prior art. It should be pointed out that the solvents utilized in this invention can be easily recycled through distillation techniques for an indefinite number of times. In addition, solvent losses are relatively low thus making the method of this invention satisfactory and economical.

Having thus described our invention, we claim:

1. A method for the preparation of solid agglomerates of quaternary modified acrylamide polymers which method comprises the steps of:

(A) preparing a water-in-oil emulsion containing polytrimethyl amino methylol acrylamide chloride;
(B) adding to said water-in-oil emulsion a water miscible organic liquid from the group consisting of acetone, methanol, ethanol and isopropanol or mixtures thereof;
(C) contacting said water-in-oil emulsion with said water miscible organic liquid in the presence of agitation whereby the polymer contained in the water-in-oil emulsion is precipated; and then,
(D) recovering solid agglomerates of polytrimethyl amino methylol acrylamide chloride.

2. The method of claim 1 wherein the water miscible organic liquid which is a non-solvent for the polymer is a mixture of acetone and methanol.

3. The method of claim 1 wherein after step C, the precipitated material is filtered and washed with a water miscible organic liquid which is a non-solvent for the polymer.

4. The method of claim 1 wherein the volume of the water miscible organic liquid which is a non-solvent for the polymer is from 1–20 times the volume of the water-in-oil emulsion containing polytrimethyl amino methylol acrylamide chloride.

* * * * *